United States Patent

Freund et al.

[11] Patent Number: 5,983,730
[45] Date of Patent: *Nov. 16, 1999

[54] METHOD AND APPARATUS FOR MEASURING THE TIME OF FLIGHT OF A SIGNAL

[75] Inventors: William Freund; Winsor Letton, both of Houston, Tex.; James McClellan, Marietta, Ga.; Baocang Jia; Anni Wey, both of Houston, Tex.; Wen Chang, Sugar Land, Tex.

[73] Assignee: Daniel Industries, Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/964,577

[22] Filed: Nov. 5, 1997

Related U.S. Application Data

[63] Continuation of application No. 08/086,738, Jul. 3, 1993, abandoned.

[51] Int. Cl.$^6$ ........................ G01F 1/66
[52] U.S. Cl. ................ 73/861.28; 73/861.27
[58] Field of Search ................ 73/861.27, 861.28, 73/861.29, 861.31

[56] References Cited

U.S. PATENT DOCUMENTS 4,080,574   3/1978   Loosemore et al. ............ 328/109

*Primary Examiner*—Joseph L. Felber
*Attorney, Agent, or Firm*—Conley, Rose & Tayon

[57] ABSTRACT

An apparatus for measuring the time of flight of a signal is provided. The apparatus for measuring the time of flight of a signal comprises a transmitter for emitting a signal, a receiver for receiving the signal from the transmitter, and means for detecting the onset of the signal as it arrives at the receiver such that the period of time from emission by the transmitter to the time the receiver initially receives the signal can be determined. In another embodiment, the present invention provides a method for determining the time of flight of a signal comprising the steps of receiving a transmitted signal, operating on the received signal for generating a pre-conditioned signal, conditioning the pre-conditioned signal for removing irregularities therefrom for generating a conditioned signal, operating on the conditioned signal to form a discriminated signal, and determining the critical point of the discriminated signal such that the critical point can be used to determine the time of flight of the signal from the instant of transmission to the instant reception.

87 Claims, 9 Drawing Sheets

METHOD AND APPARATUS FOR MEASURING THE TIME OF FLIGHT OF A SIGNAL

CROSS REFERENCE TO RELATED APPLICATION

The present application is a continuation application of prior application Ser. No. 08/086,738, now abandoned, filed on Jul. 3, 1993 of William Freund, Winsor Letton, James McClellan, Boacang Jai, Anni Wey and Wen Chang for "Method And Apparatus For Measuring The Time Of Flight Of A Signal.

FIELD OF THE INVENTION

The present invention relates to a method and apparatus for measuring the time of flight of a signal between two points or the time of flight of a reflected signal to return to the original point. Also, the present invention relates to a method for measuring the time difference between reception of the same signal at two different locations. Both analog and digital techniques are applicable to the present invention. The method and apparatus of the present invention is applicable with ultrasonic flow meters and, generally, any detector which uses the time a signal takes to go from one point to another to make a measurement. All measurements applicable for use with the present invention are referred to as time of flight measurements.

BACKGROUND OF THE INVENTION

Many measuring techniques and devices require an accurate measurement of the time of flight of a signal. Any technique or device that measures the time of travel of a wave or signal requires a degree of accuracy in determining the measurement. The application dictates the degree of accuracy required. The quantitative determination of the time of travel of a wave or signal in some situations can be relatively easy, or can be difficult. Thus, the need for an accurate measure of the time of travel with respect to the more difficult applications has led to problems in accurate metering. For example, applications which require measurement precision of less than one period of the signal are difficult. Examples of such metering techniques requiring time-of-flight estimates are flow, level, speed of sound, and acoustic impedance measurements. The accurate measurement of the time of travel of the signal is a basic requirement for an effective technique or device.

The measurement of the time of flight of a sonic or ultrasonic signal has different complications than the measurement of the time of flight of a radar signal. In the example of radar, where the time resolution is long with respect to the period of the signal, the time of flight can be readily measured by viewing the envelope of the returning energy. The measurement when the time resolution is short with respect to the period of the signal is more difficult.

Such prior devices and methods which can be used with or are associated with the present invention include, for example, U.S. Pat. No. 2,724,269 to Kalmus entitled "Apparatus for Measuring Flow," U.S. Pat. No. 4,646,575 to O'Hair and Nolan entitled "Ultrasonic Flow Meter" and U.S. Pat. No. 5,178,018 to Gill entitled "System for Measuring the Time for a Signal to Pass Between Two Spaced Points in a Fluid." With respect to U.S. Pat. No. 2,724,269, the phase shift of a signal is associated with a reference. The '269 patent describes periodically interchanging the transmitter and the receiver. U.S. Pat. No. 4,646,575 describes using multiple paths of ultrasonic energy which paths are angularly disposed with regard to the flow and each other. U.S. Pat. No. 5,178,018 provides a system applicable for use in continuous-state wave applications. A phase shift is measured at a particular point in time and used to determine the time for the signal to pass between two spaced points.

It is, therefore, a feature of the present invention to provide method and apparatus for measuring accurately the time of flight of a signal where the period of the signal is long compared to the required time resolution.

A feature of the present invention is to provide an method and apparatus for enhancing the ability to select a specific part of the associated waveform for determining the time of flight of the signal.

Another feature of the present invention is to provide an method and apparatus which enhances the ability to process a signal to determine the time of flight of a signal.

Yet another feature of the present invention is to provide an apparatus for measuring the time of flight of a signal which measurement is not compromised by noise generated by turbine meters, compressors and valves.

Another feature of the present invention is the ability to accurately measure the time of flight of a signal, transmitted from, for example, an ultrasonic transmitter, when the signal is corrupted by the presence of noise.

Yet still another feature of the present invention is to provide an method and apparatus for measuring the time of flight of a signal which method and apparatus is adaptive to signal changes caused by external influences.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, the apparatus for measuring the time of flight of a signal between two points comprises a transmitter for emitting a signal, a receiver for receiving the signal from the transmitter, means for detecting the onset of the received signal, means for determining a point of measurement within the received signal, and means for measuring the elapsed time from transmission of the signal to the point of measurement.

In another embodiment, the present invention provides a method for determining the time of flight of a signal comprising the steps of receiving a transmitted signal, operating on the received signal for generating a pre-conditioned signal, operating on the pre-conditioned signal to remove irregularities therefrom for generating a conditioned signal, and operating on the conditioned signal to find the onset of the signal and thus the time of flight thereof. The onset of the signal is represented by or defined as the critical point.

The step of operating on the received signal for generating a pre-conditioned signal can be applying any function to the received signal which enhances the ability to detect the received signal. For example, the received signal can be squared. In addition to enhancing the ability to detect the received signal, it is exceptionally advantageous to square the received signal so that the energy can be acquired. However, numerous and sundry methods for operating on the received signal may be known to those skilled in the art. For example, the absolute value of the received signal may be taken, a full wave rectification of the received signal may be used, and a half wave rectification of the received signal may be used for enhancing the ability to detect the received signal.

The step of operating on the pre-conditioned signal to remove irregularities can be accomplished in numerous ways by those skilled in the art of signal analysis. A preferred embodiment of the present invention is to average the pre-conditioned signal using a moving window thus forming a conditioned signal. Various window functions can be used. Similarly, various window lengths can be used. The window function moves along the pre-conditioned signal averaging groups of points. In the presently preferred embodiment, 21 points have been used. It has been found that a rectangular window function provides exceedingly good results. Other conditioning techniques are readily known in the art and may be adopted for use with the present invention.

The step of determining the critical point is important with respect to practicing the present invention. The critical point discriminates between where the received signal is present, and where it is not present or, worse, occupied by noise. Determining the critical point is preferably accomplished by using some discrimination function, f(n,n–1).

In a preferred embodiment of the present invention, an energy ratio is used to determine the critical point which identifies the beginning or onset of the received signal. The energy ratio is provided by the following equation:

$$ER_n = \frac{E_n}{E_{n-l}}$$

where $ER_n$ is the energy ratio at location n, $E_n$ is representative of the energy at location n, and $E_{n-l}$ is representative of the energy at location n–l such that l is the time lag, i.e., the number of time units prior to sample n. Alternately, the discrimination function may be accomplished by taking the derivative of the conditioned signal.

In a preferred embodiment, a method for measuring the time of flight of a signal is provided comprising the steps of identifying a critical point associated with the beginning of the received signal, ascertaining a marker point related to an intrinsic characteristic of the received signal and having a temporal relationship with the critical point, and using the marker point for determining the time-of-flight of the signal. Those skilled in the art appreciate that signals have intrinsic characteristics. For example, an intrinsic characteristic may be a peak, a trough a positive zero crossing or a negative zero crossing. A signal attribute is defined as a particular intrinsic characteristic of the signal. An example of a signal attribute is the second zero crossing after the critical point.

In a more detailed preferred embodiment, a method for measuring the time of flight of a signal is provided comprising identifying a critical point associated with the beginning of the received signal. The identification of the critical point is accomplished by evaluating the energy ratio function of the received signal, and setting the critical point on the positive slope and at approximately one-fourth of the maximum of the energy ratio curve. Marker points on the received signal are determined. The marker points are determined by ascertaining two or more points related to a signal attribute which attribute is an intrinsic characteristic of the received signal. Also, the signal attribute has a temporal relationship with the critical point. The signal attribute selected is a zero crossing, and the marker points on the received signal are proximate to and bracket the zero crossing. The location of the attribute is determined by interpolating between the marker points to determine the point of measurement of the zero crossing. The location of the attribute represents the time-of-flight of the signal.

It can also be appreciated by those skilled in the art that even the critical point could be used to calculate the time of flight of the signal.

BRIEF DESCRIPTION OF THE DRAWINGS

The accompanying drawings which are incorporated in and constitute a part of the specification, illustrate preferred embodiments of the invention and together with the general description of the invention given above and the detailed description of the preferred embodiments given below, serve to explain the principles of the invention.

The above description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
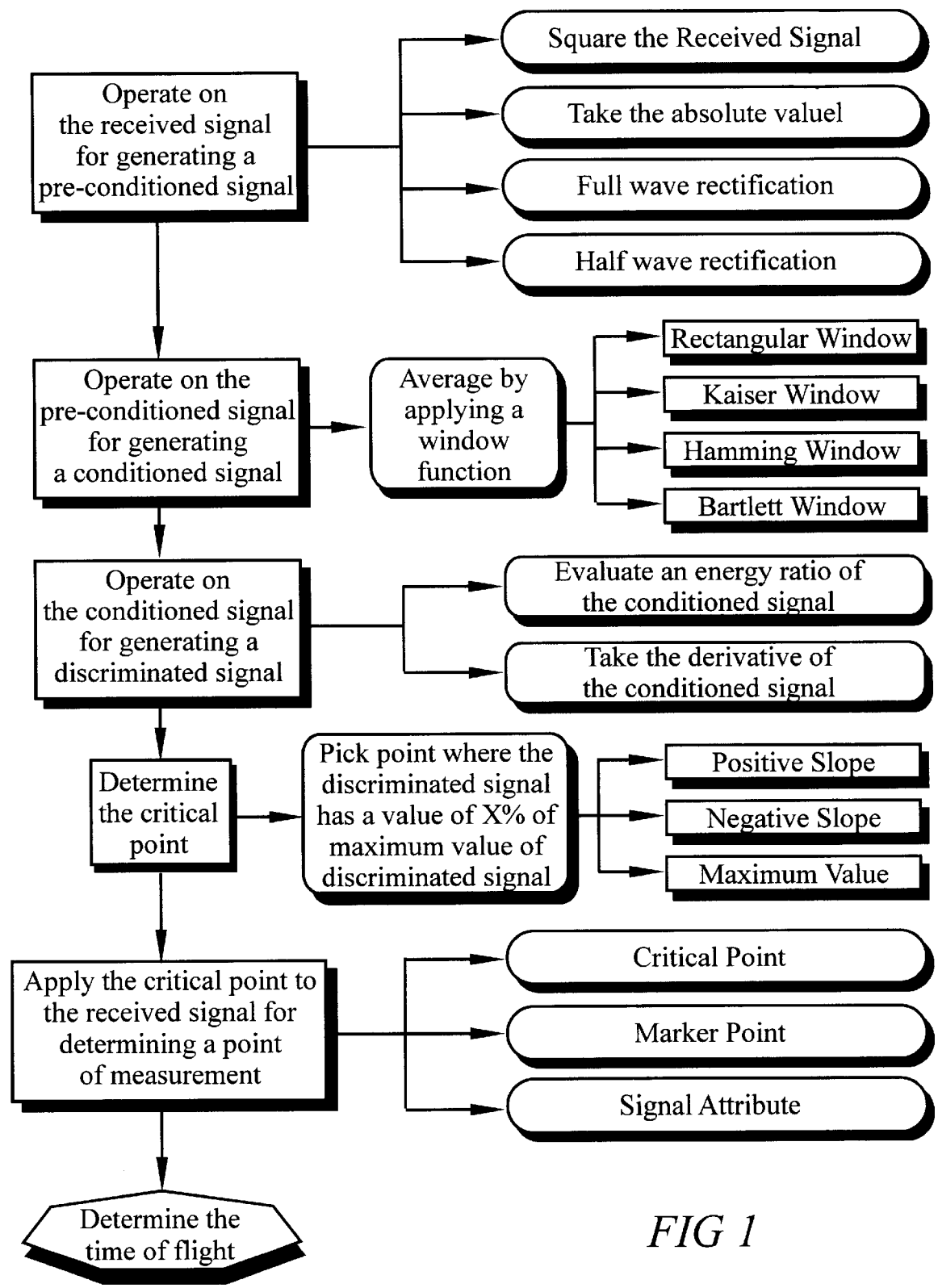
FIG. 1 is a flow diagram illustrating an overview of multiple embodiments of the method of the present invention.
Figure 6:
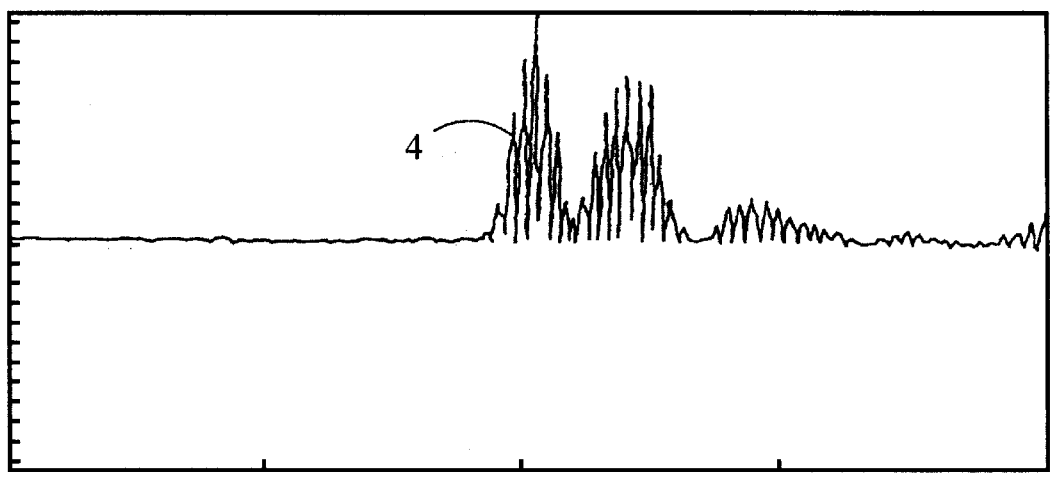
FIG. 6 is an illustration of one embodiment of a pre-conditioned signal associated with the received signal illustrated in FIG. 5.
Figure 7:
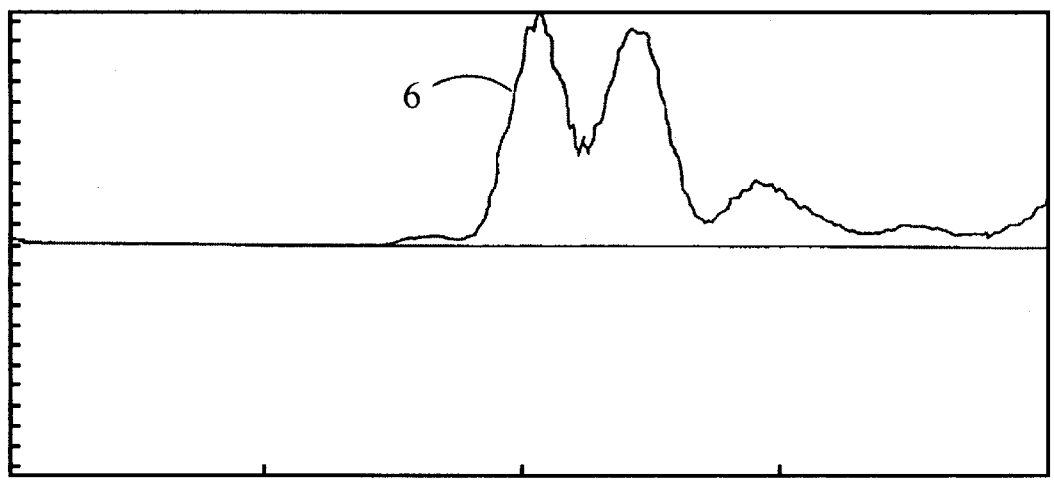
FIG. 7 is an illustration of one embodiment of a conditioned signal associated with the pre-conditioned signal illustrated in FIG. 6 and the received signal illustrated in FIG. 5.
Figure 8:
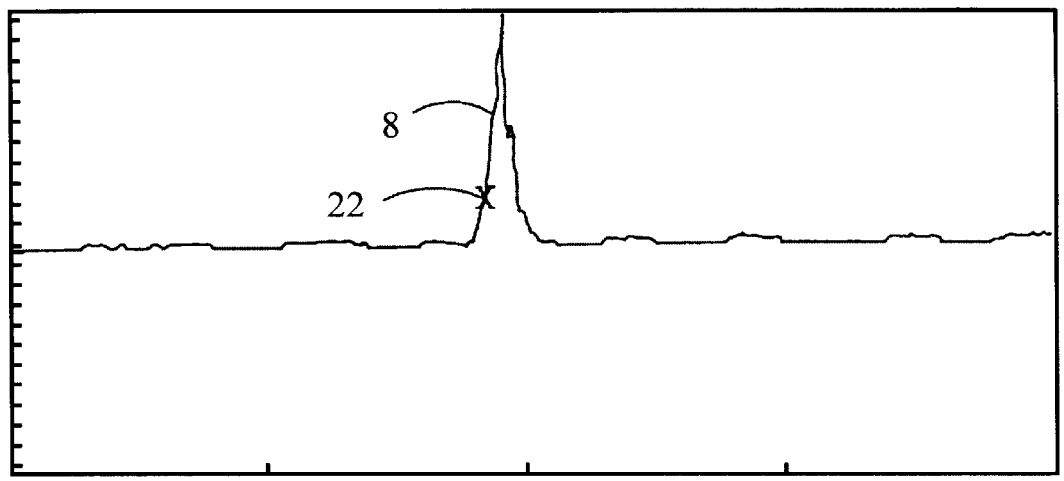
FIG. 8 is an illustration of the discriminated signal and the critical point associated with the received signal practicing one embodiment of the present invention.

FIG. 1 is a flow diagram illustrating an overview of several embodiments of the method of the present invention. The received signal is operated on for generating a pre-conditioned signal as illustrated in FIG. 6. The pre-conditioned signal is operated on for generating a conditioned signal. An illustration of the conditioned signal as practiced by the present invention is illustrated in FIG. 7. As illustrated in FIG. 8, a discrimination function is applied based upon the ratio of the energy of the received signal with a time shifted version of itself, i.e., the energy ratio function. The energy ratio function provides an exceptional, although not exclusive, technique for determining the critical point. Further, the critical point provides an indication of initial rise or the onset of the received signal. The critical point is applied to the received signal for determining a point of measurement. Thereafter, the time of flight can be determined.

FIG. 1 illustrates numerous embodiments of the present invention. The specific steps are operating on the received signal for generating a pre-conditioned signal, operating on the pre-conditioned signal for generating a conditioned signal, operating on the conditioned signal for generating a discriminated signal, determining the critical point, applying the critical point to the received signal for determining a point of measurement, and determining the time of flight. The specific steps can be implemented using various procedures or techniques. The step of operating on the received signal for generating a pre-conditioned signal can include squaring the signal, taking the absolute value of the signal, applying a full wave rectification of the signal, applying a half wave rectification of the signal, or some other method which would provide for the type of operation described which would generate the pre-conditioned signal. The operation on the pre-conditioned signal for generating a conditioned signal provides that an average is taken by applying a moving window function. Preferably, the moving window function is rectangular. However, other window functions are readily applicable in practicing the present invention, for example, a Hanning window, a Kaiser window, a cosine window or a Bartlett window are also applicable when using the present invention. The operation on the conditioned signal for generating a discriminated signal preferably provides that an energy ratio function is evaluated with respect to the conditioned signal. However, an alternate procedure is taking the derivative of the conditioned signal. Other procedures may be applicable. Determining the critical point provides that a point is selected where the discriminated signal has a value of some percentage of the maximum value of the discriminated signal. This determination of the critical point includes using a positive slope, using a negative slope, using a maximum value or the like. The application of the critical point to the received signal for determining a point of measurement includes selecting the critical point, determining the marker points, and evaluating an appropriate signal attribute. Thereafter, the time of flight can be determined.

Figure 2:
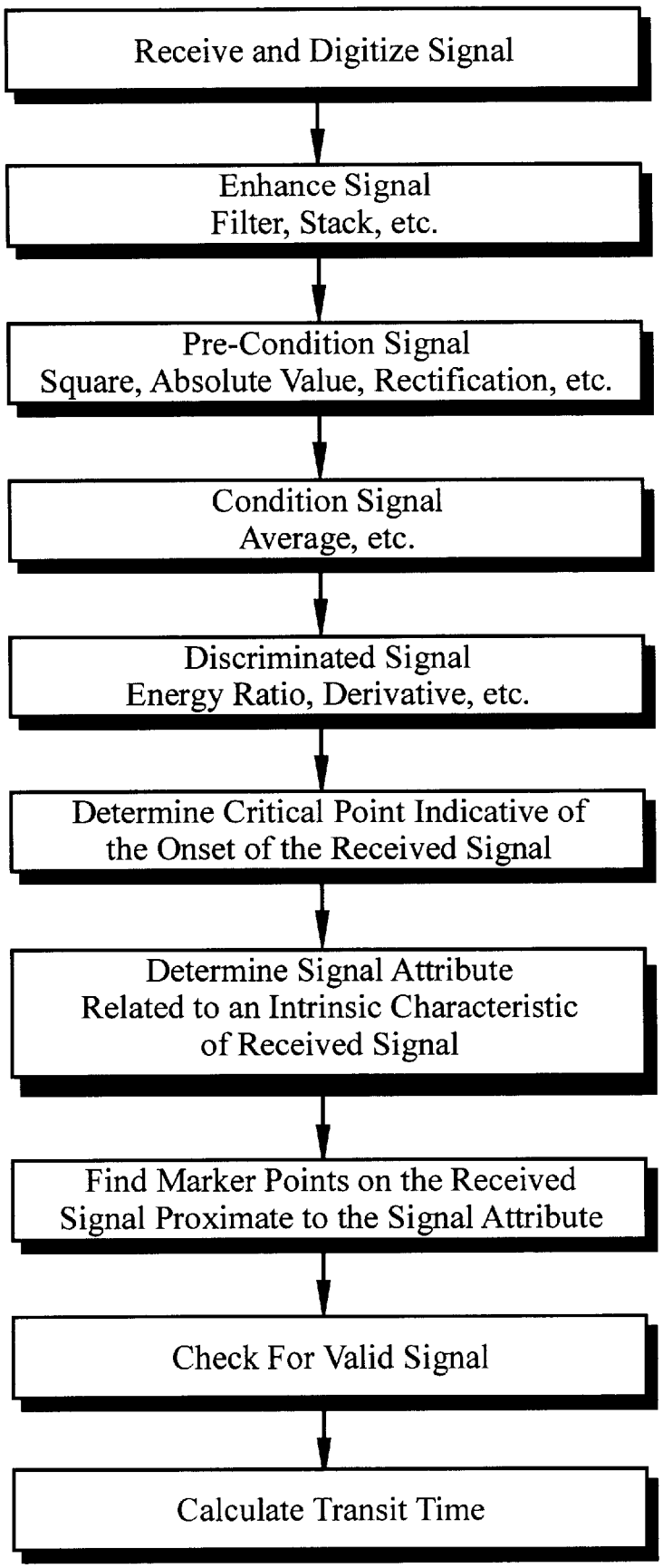
FIG. 2 is a block diagram illustrating the time of flight measurement of the present invention.

FIG. 2 is a block diagram illustrating the time of flight measurement of the present invention. In a preferred embodiment, as illustrated in FIG. 2, a signal is received and digitized to form a received signal that can be electronically manipulated. The received signal can be enhanced. The need for enhancement of the signal, or not, is situation specific. Enhancement is possible by techniques known to those skilled in the art. For example, the received signal can be enhanced by filtering out high or low frequency noise. Alternately, the received signal can be enhanced by stacking. With respect to the present invention, stacking is defined as the repeated summation of several signals so as to diminish the random noise and emphasize the real signal. The energy associated with the received signal is calculated to form a pre-conditioned signal. The pre-conditioned signal is then averaged to form a conditioned signal. The averaging is accomplished by using a moving window function. A discrimination function is then used. The discrimination function determines the ratio of the energy of the received signal with a time shifted version of itself. The critical point is located with respect to the received signal. The received signal is detected by determining the location of the critical point on the leading edge of the energy ratio curve. In a preferred embodiment, the value of the critical point is 25% of the maximum of the energy ratio curve. A marker point is located on the received signal. The marker point is a sampled point on the received signal proximate to an attribute of the signal, and in known temporal relationship to the critical point. The signal is checked or validated. A check is performed to determine that a valid analysis has been achieved. The check can, for example, use one or more of the following: identify points on the received signal before the marker points, identify points on the received signal after the marker points, check the signal for the expected period and amplitude, check that the difference between each marker point and the critical point is within an allowed range. Thereafter, the transit time can be readily calculated.

Figure 3:
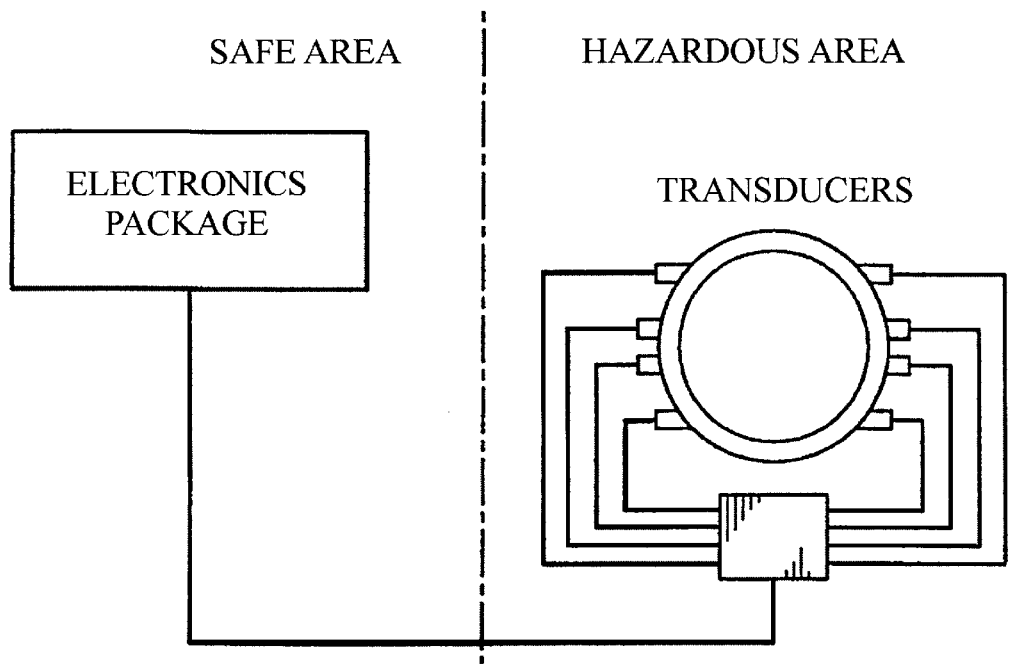
FIG. 3 is an overview illustration of an apparatus employing the present invention.

FIG. 3 is a general illustration of a representative apparatus for employing the present invention.

Figure 4:
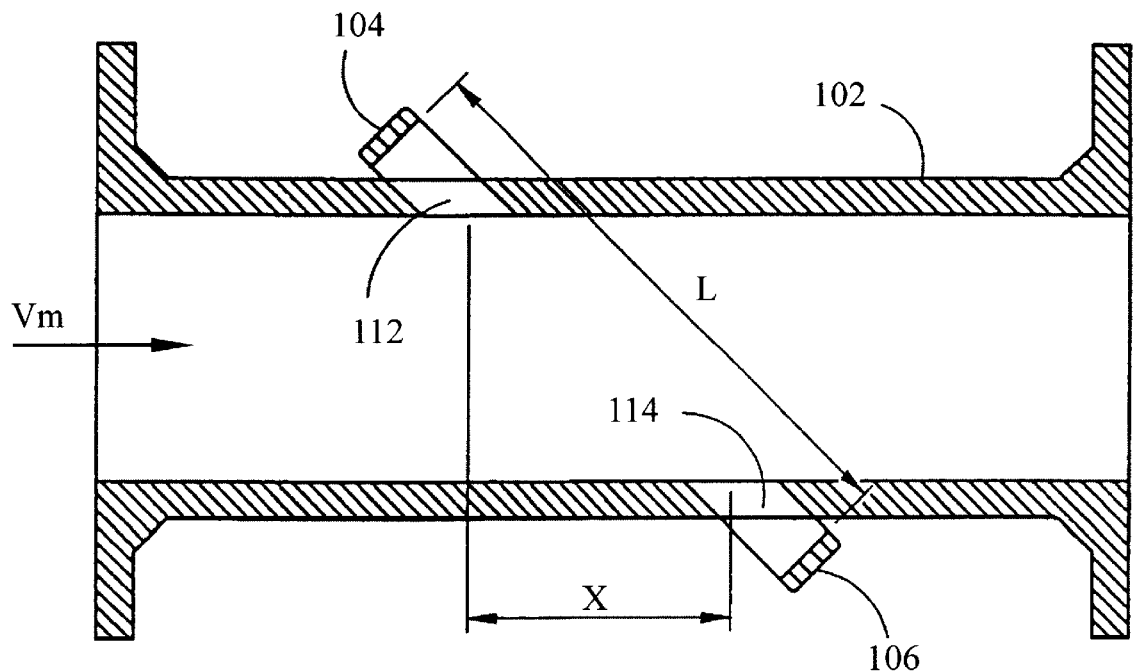
FIG. 4 is a perspective cross-section of a pipe illustrating one embodiment of the orientation of transducers which could be used in association with the present invention.

FIG. 4 is a perspective cross-section of a pipe illustrating one embodiment of the orientation of transducers which could be used in practicing the present invention. The pipe 102 is adapted for receiving the transducers 104, 106. The transducers 104, 106 are displaced on opposite sides of the pipe 102 by a distance L between each transducer. The transducers 104, 106 are longitudinally displaced by a distance of X. The pipe 102 has notches 112, 114 for receiving the transducers 104, 106, respectively.

Figure 5:
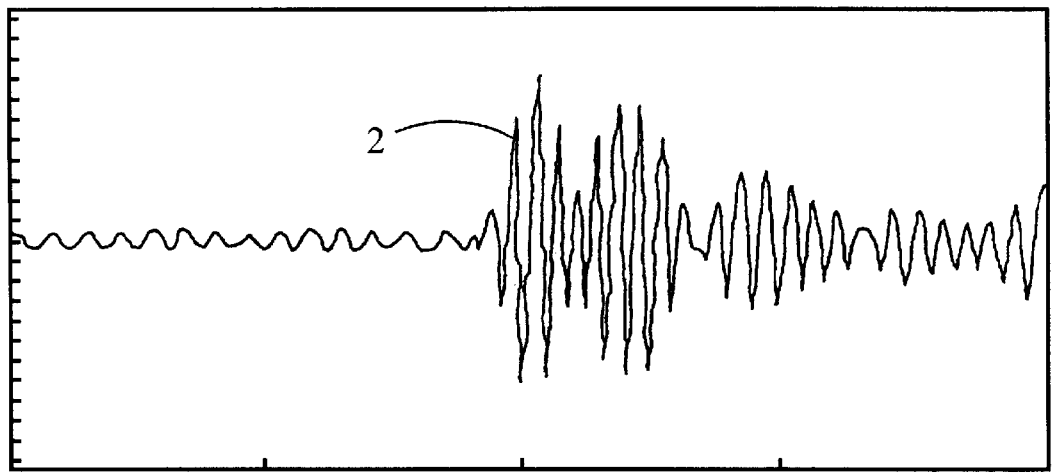
FIG. 5 is an illustration of a received signal or waveform which has been digitized in association with practicing one embodiment of the present invention.

FIG. 5 is an illustration of a received signal or waveform 2 which has been digitized in association with practicing one embodiment of the present invention. The signal is transmitted from a transducer, for example, the transducer illustrated in FIG. 4. The signal takes some period of time to travel a distance, L, from transmission to reception. The signal is received by a transducer, for example, the transducer illustrated in FIG. 4. The received signal 2 is digitized.

FIG. 6 is an illustration of one embodiment of a pre-conditioned signal 4 associated with the received signal 2 illustrated in FIG. 5. Although various methods of determining the pre-conditioned signal 4 may be readily available to those skilled in the art, a preferred way, as practiced by the present invention, is to take the square of the received signal 2, yielding a representation of the energy. Numerous and sundry methods for operating on the received signal 2 to achieve an effective pre-conditioned signal 4 may be known to those skilled in the art as previously discussed. The curve of FIG. 6 illustrates the pre-conditioned 4 signal or function of the received signal 2 illustrated in FIG. 5 which has been squared.

FIG. 7 is an illustration of one embodiment of a conditioned signal 6 associated with the pre-conditioned signal 4 illustrated in FIG. 6 and the received signal 2 illustrated in FIG. 5. A preferred way of determining the conditioned signal 6 or function, as practiced by the present invention, is to average the pre-conditioned signal 4 by applying a window function i.e. using a moving window. The window function moves along the pre-conditioned signal 4 averaging groups of points. In the presently preferred embodiment, 21 points have been used for each window frame. It has been found advantageous to have the length of the window proportional to the period of the received signal 2. Further, a window length between 0.5 and 5.0 of the period of the received signal 2 has been found to be beneficial. It has been found that a rectangular window function of two periods in length provides exceedingly good results. It can be appreciated that other window types can be used such as those known in the art as Hamming, Kaiser, Hanning and Bartlett windows. Further, a different number of points can be adopted for use with the present invention. The curve of FIG. 7 illustrates the conditioned signal formed from the pre-conditioned signal by averaging using a moving window.

FIG. 8 is an illustration of the energy ratio curve and the critical point associated with the received signal practicing one embodiment of the present invention. The critical point is determined by operating on the conditioned signal with a discrimination function such as f(n,n−1). In a preferred embodiment of the present invention, the determination of the critical point from the energy ratio curve is used to identify the beginning or onset of the signal. The energy ratio function is provided by the following equation:

$$ER_n = \frac{E_n}{E_{n-l}}$$

where $ER_n$ is the energy ratio at the location n, $E_n$ is representative of the energy at location n, and $E_{n-l}$ is representative of the energy at location n−l such that l is the time lag, i.e., the time units prior to sample n. For example, l is 15 time units. It has been found advantageous to select a time lag proportional to the period of the received signal 2. Further, it has been found advantageous to select a time lag between 0.1 and 10 periods of the received signal 2. An example of the energy ratio curve or discriminated signal 8 is illustrated in FIG. 8. Typically, the energy ratio curve is a steep, spiked curve occuring approximately at the same time as the onset of the received signal (See FIG. 9).

Various and sundry techniques may be used to evaluate the critical point as taught by the present invention. It has been found that critical points coincide with the continuum of the energy ratio curve having a positive slope. In a preferred embodiment, approximately one-fourth of the maximum of the energy ratio curve defines the critical point effectively approximating the onset of the received signal. FIG. 8 illustrates the critical point 22 marked "X" on the energy ratio curve at approximately 25% of the maximum of the energy ratio curve.

Figure 9:
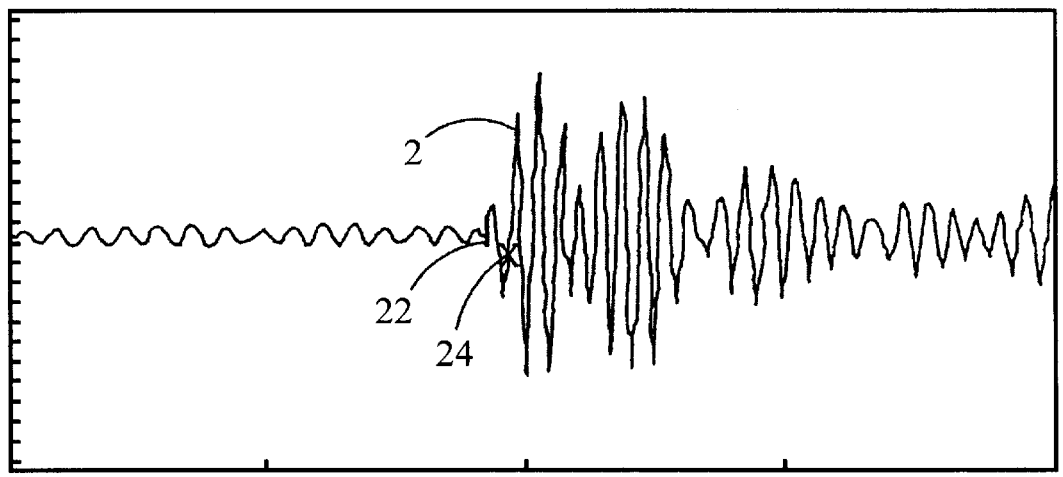
FIG. 9 is an illustration of a location determined to be the marker point of the received signal proximate to the signal characteristic.

FIG. 9 is an illustration of the location determined to be the marker point 24 of the received signal 2 proximate to the signal attribute. The signal attribute is an intrinsic characteristic of the received signal 2. Thus, on FIG. 9, the marker point 24 is an actual point the received signal 2 proximate to the received signal attribute, which attribute is a zero crossing after the critical point 22. The marker points can be, for example, the points of the signal received signal 2 adjacent to the attribute. Choosing sample points immediately adjacent to the attribute as the marker points is a presently preferred embodiment of the invention. It is preferred to calculate the time of flight of the signal using the signal attribute, however, the time of flight of the signal can be calculated based upon the marker points' representation.

The preferred embodiment of the measurement of the time of flight of the signal practicing the present invention uses an approximation of the signal attribute. The preferred approximation of the signal attribute is the approximation of a zero crossing. The approximation can be made by determining two sample points which are adjacent to and bracket the signal attribute. These particular sample points are the marker points for the signal. The attribute can be determined by interpolating between the marker points. The time of flight of the signal is calculated based upon the location of the signal attribute.

Figure 10:
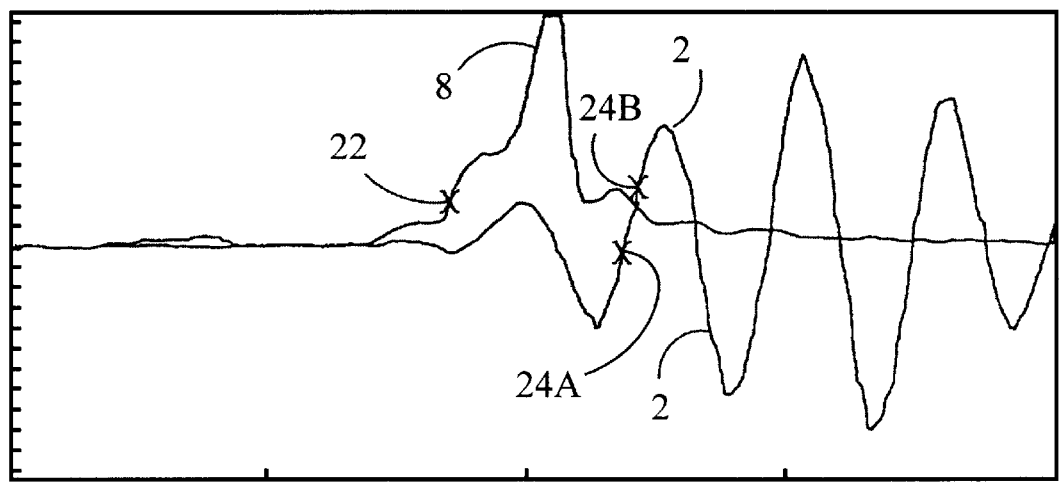
FIG. 10 is a blow-up view of another typical received signal, including its associated energy ratio curve, critical point and marker points.

FIG. 10 is a blow-up view of another typical received signal 2, including its associated energy ratio curve 8, critical point 22 and marker points 24A, 24B. The received signal 2 is illustrated as a solid line. The energy ratio curve 8 associated with the received signal 2 is illustrated as a solid line. The value of one-fourth of the energy ratio curve 8 is illustrated on the increasing slope of the energy ratio curve 8. It can be readily appreciated by those skilled in the art that various other signal location points, such as the marker points 24A, 24B, can be readily determined from this technique. It is considered that finding all of these other signal locations, as associated with the general method of the present invention, are adapted for use, and included in, the present invention. The present invention provides that one or more points on the received signal 2 are to be used as the marker points 24A, 24B with generally known interpolation techniques for determining the point of measurement for making the time measurement.

Figure 11:
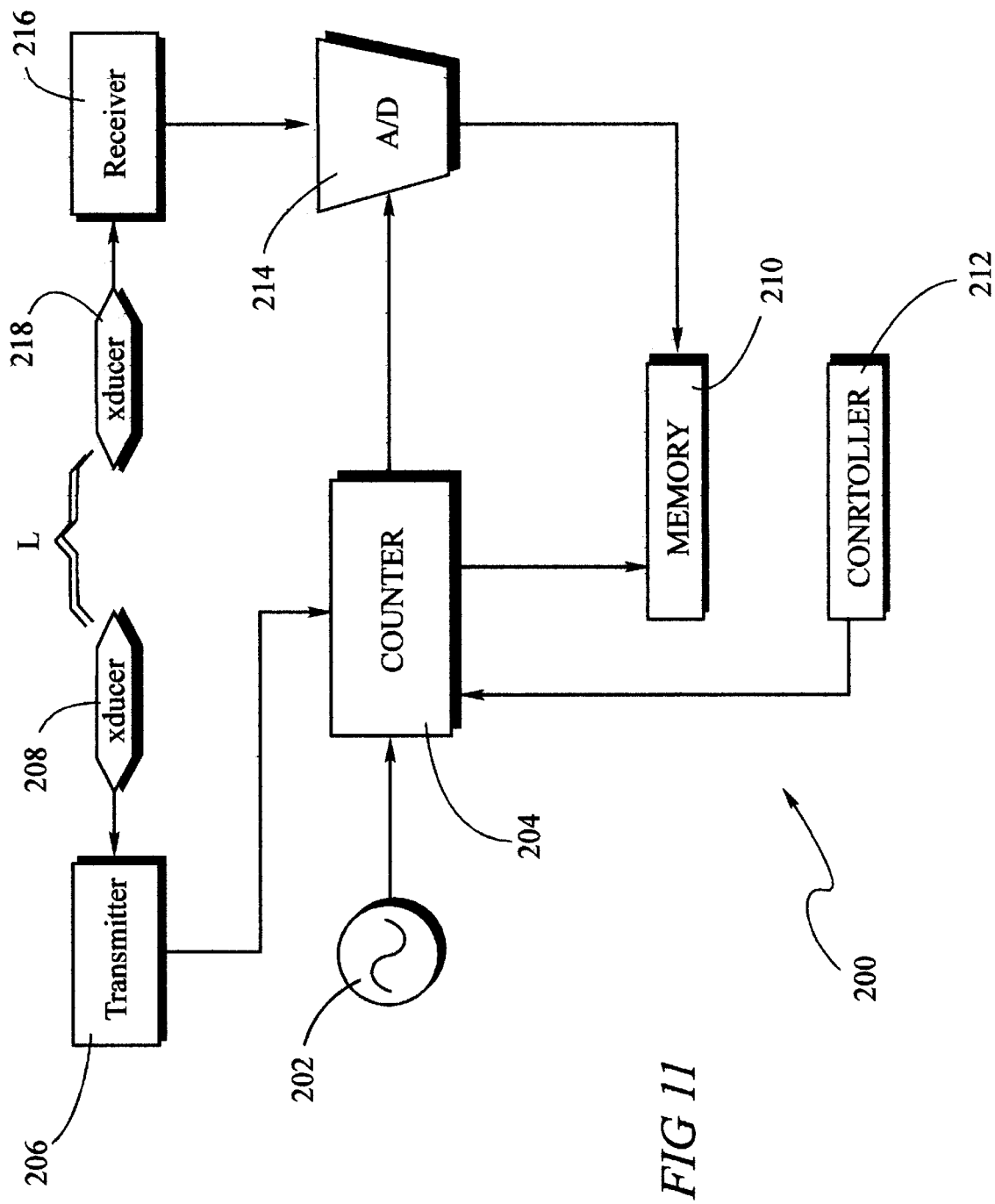
FIG. 11 is a diagram illustrating electronics associated with the apparatus of the present invention.

FIG. 11 is a block diagram illustrating the apparatus 200 of the present invention. The apparatus 200 of the present invention comprises a clock 202, a counter 204, a transmitter 206, a first transducer 208, a memory 210, a controller 212, an analog-to-digital converter 214, a receiver 216 and a second transducer 218. The clock 202 is used for timing.

In operation, the transmitter 206 is fired. The apparatus 200 starts digitizing. The A/D converter 214 is activated. The counter 204 starts counting. At every count of the counter 204, the A/D converter 214 places a magnitude from the receiver 216 into the next location in the memory 210. Thus, as time passes, the memory 210 develops a curve as illustrated in FIG. 5. The data accumulated in the memory 210 is processed as previously discussed to determine the time measurement.

Although the apparatus 200 illustrated in FIG. 11 indicates there are dual transducers 208, 218, it can be appreciated that a single transducer may be readily adapted for practicing the present invention. For example, a single transceiver device may be used to measure a reflected signal. Further, it can be appreciated by those skilled in the art that various system arrangements are readily available for practicing the present invention. Additional circuitry can be used to alternate the transmitter 206 and the receiver 218. Also, techniques or equipment can be readily adapted by those skilled in the art to delay the start of the A/D converter 214 until a later time prior to the arrival of the signal.

Figure 12:
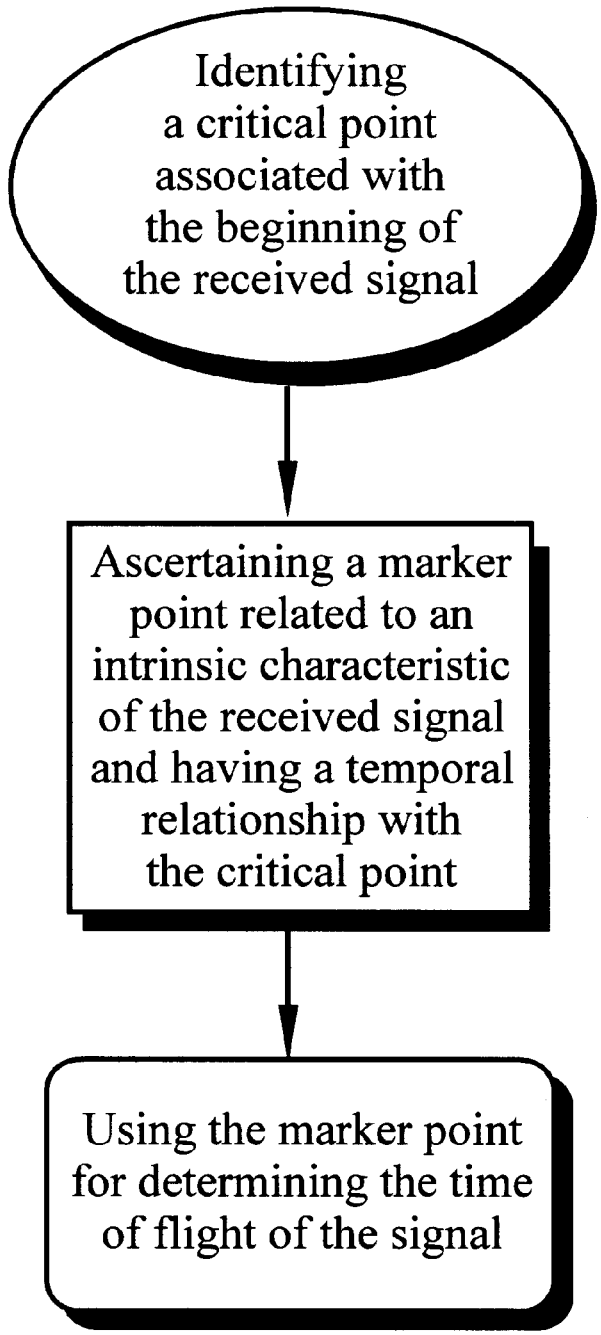
FIG. 12 is a flow diagram illustrating one embodiment of the method of the present invention.

FIG. 12 is a flow diagram illustrating one embodiment of the method of the present invention. Particularly, the method illustrated in FIG. 12 identifies a three-step method. First, a critical point must be identified. The critical point is associated with the beginning of the received signal. Second, a marker point must be ascertained. The marker point is related to an intrinsic characteristic of the received signal and has a temporal relationship with the critical point. Third, the marker point is used for determining the time of flight of the signal.

Figure 13:
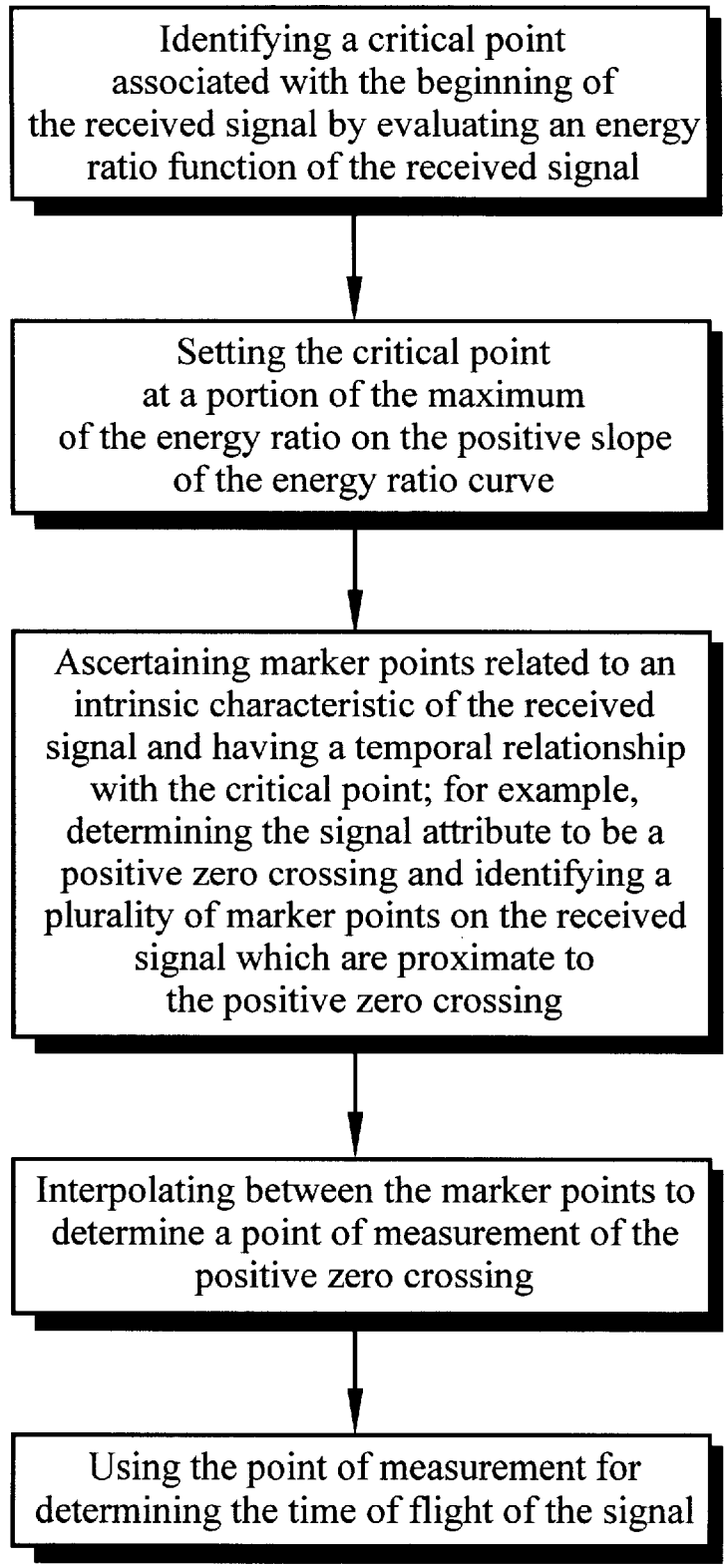
FIG. 13 is a flow diagram illustrating another embodiment of the method of the present invention.

FIG. 13 is a flow diagram illustrating another embodiment of the method of the present invention. The method illustrated in FIG. 13 is a more elaborate and detailed method based on the method illustrated in FIG. 12. The method of FIG. 13 illustrates five basic steps. First, a critical point is identified. The critical point is associated with the beginning of the received signal. As one method of identifying the critical point, the energy ratio function of the received signal can be evaluated. Second, the critical point is set at a portion of the maximum of the energy ratio curve on the positive slope of the curve. For example, the critical point can be set to approximately one fourth of the maximum on the positive slope of the energy ratio curve. Third, marker points are ascertained. The marker points are related to an intrinsic characteristic (signal attribute) of the received signal and have a temporal relationship with the critical point. The signal attribute can be, for example, a peak, a trough, a positive zero crossing, etc. A plurality of marker points are identified. The plurality of marker points would be on the received signal and are proximate to the positive zero crossing identified as the signal attribute. Fourth, the marker points are used such that an interpolation between them is made to determine a point of measurement of the signal attribute, for example, a positive zero crossing, a peak, a trough or other attribute of the signal. Fifth, the signal attribute (the peak, the trough, the positive zero crossing, etc.) is used to determine the time of flight of the signal.

Figure 14:
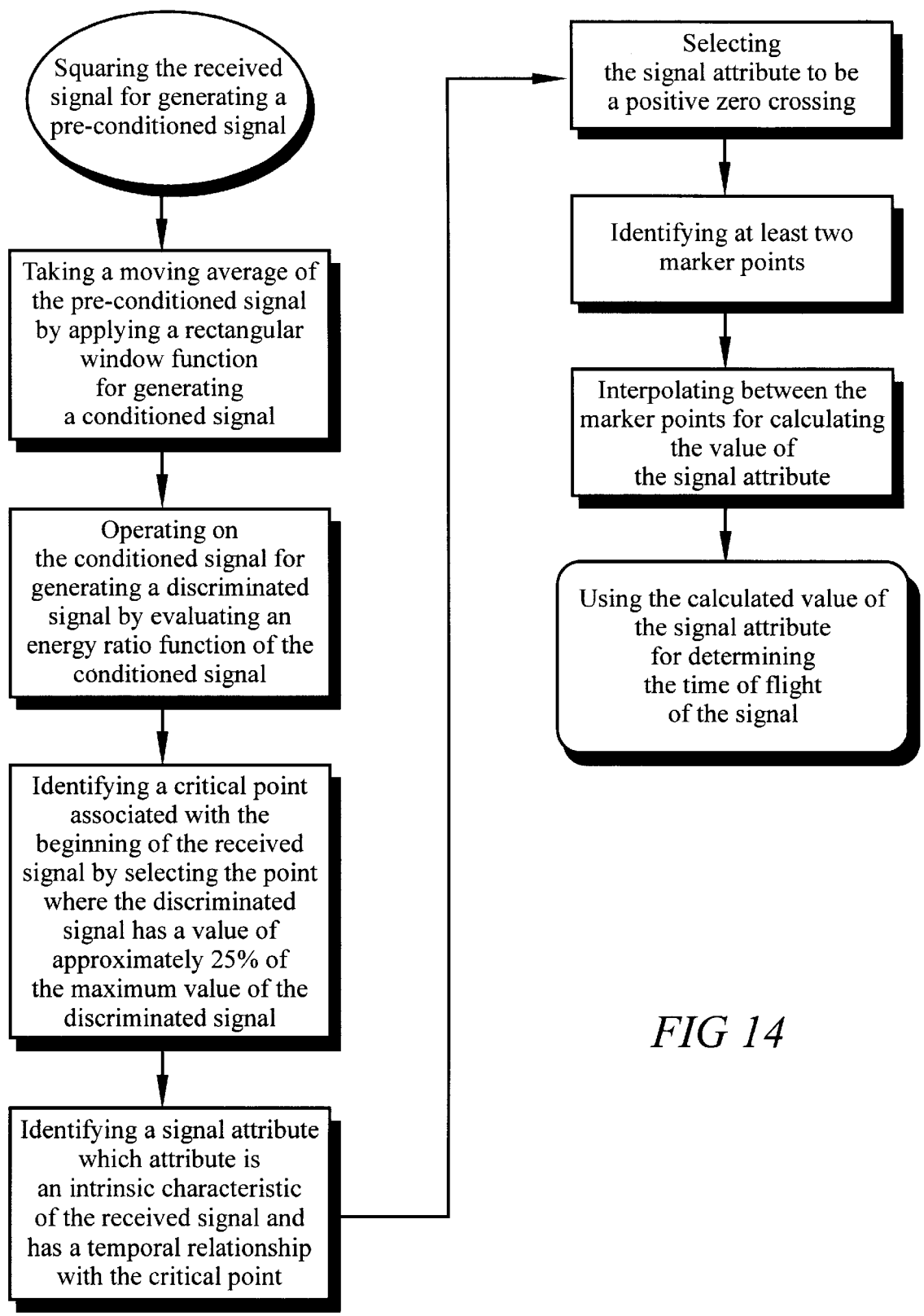
FIG. 14 is a flow diagram illustrating yet another embodiment of the method of the present invention.

FIG. 14 is a flow diagram illustrating another detailed embodiment of the method of the present invention. The detailed embodiment illustrated in FIG. 14 has nine steps. First, the received signal is squared for generating a pre-conditioned signal. A moving average is taken of the pre-conditioned signal by applying a window function. The application of the window function generates a conditioned signal. The conditioned signal is operated on for generating a discriminated signal. The operation on the conditioned signal is the evaluation of an energy ratio function of the conditioned signal. A critical point is associated with the beginning of the received signal. Preferably, the selected point is that part of the discriminated signal having a value of approximately 25% of the maximum value of the discriminated signal. A signal attribute is identified. The signal attribute is an intrinsic characteristic of the signal and has a temporal relationship with the critical point. The signal attribute is selected to be a positive zero crossing. At least two marker points are identified. The value of the signal attribute is calculated by interpolating between the marker points. Lastly, the calculated value of the signal attribute is used for determining the time of flight of the signal.

Additional advantages and modifications will readily occur to those skilled in the art. The invention in its broader aspects is therefore not limited to the specific details, representative apparatus, and the illustrative examples shown and described herein. Accordingly, departures may be made from the details without departing from the spirit or scope of the disclosed general inventive concept.

What is claimed is:

1. A method of measuring the time-of-flight of a signal in an ultrasonic flow meter comprising:
   (a) transmitting a signal through a flowing fluid with a transducer;
   (b) sensing the signal with a sensor to produce a received signal;
   (c) identifying a critical point where the critical point is defined as the estimated beginning of the received signal, and
   (d) using the critical point for determining the time-of-flight of the signal.

2. The method of measuring the time-of-flight of a signal as defined in claim 1 further comprising:
   (a) operating on the received signal for generating a pre-conditioned signal,
   (b) operating on the pre-conditioned signal for generating a conditioned signal, and
   (c) operating on the conditioned signal for generating a discriminated signal.

3. The method of measuring the time-of-flight of a signal as defined in claim 2 wherein operating on the received signal for generating a pre-conditioned signal comprises squaring the received signal.

4. The method of measuring the time-of-flight of a signal as defined in claim 2 wherein operating on the received signal for generating a pre-conditioned signal comprises taking the absolute value of the received signal.

5. The method of measuring the time-of-flight of a signal as defined in claim 2 wherein operating on the received signal for generating a pre-conditioned signal comprises applying full wave rectification to the received signal.

6. The method of measuring the time-of-flight of a signal as defined in claim 2 wherein operating on the received signal for generating a pre-conditioned signal comprises applying half wave rectification to the received signal.

7. The method of measuring the time-of-flight of a signal as defined in claim 2 wherein operating on the pre-conditioned signal for generating a conditioned signal comprises averaging the pre-conditioned signal.

8. The method of measuring the time-of-flight of a signal as defined in claim 7 wherein averaging the pre-conditioned signal comprises averaging the pre-conditioned signal by applying a window function.

9. The method of measuring the time-of-flight of a signal as defined in claim 8 wherein averaging the pre-conditioned signal by applying a window function comprises averaging by applying a rectangular window function.

10. The method of measuring the time-of-flight of a signal as defined in claim 8 wherein averaging the pre-conditioned signal by applying a window function comprises averaging by applying a cosine window function.

11. The method of measuring the time-of-flight of a signal as defined in claim 8 wherein averaging the pre-conditioned signal by applying a window function comprises averaging by applying a Hamming window function.

12. The method of measuring the time-of-flight of a signal as defined in claim 8 wherein averaging the pre-conditioned signal by applying a window function comprises averaging by applying a Hanning window function.

13. The method of measuring the time-of-flight of a signal as defined in claim 8 wherein averaging the pre-conditioned signal by applying a window function comprises averaging by applying a Kaiser window function.

14. The method of measuring the time-of-flight of a signal as defined in claim 8 wherein averaging the pre-conditioned signal by applying a window function comprises averaging by applying a Bartlett window function.

15. The method of measuring the time-of-flight of a signal as defined in claim 8 wherein averaging the pre-conditioned signal by applying a window function comprises selecting the window length to be proportional to the period of the received signal.

16. The method of measuring the time-of-flight of a signal as defined in claim 15 wherein selecting the window length to be proportional to the period of the received signal comprises selecting the window length to be between 0.5 and 5.0 of the period.

17. The method of measuring the time-of-flight of a signal as defined in claim 2 wherein operating on the conditioned signal for generating a discriminated signal comprises evaluating an energy ratio curve of the conditioned signal.

18. The method of measuring the time-of-flight of a signal as defined in claim 17 wherein evaluating an energy ratio curve of the conditioned signal comprises selecting a time lag proportional to the period of the received signal.

19. The method of measuring the time-of-flight of a signal as defined in claim 18 wherein selecting a time lag proportional to the period of the received signal comprises selecting the time lag to be between 0.1 and 10 periods of the received signal.

20. The method of measuring the time-of-flight of a signal as defined in claim 2 wherein operating on the conditioned signal for generating a discriminated signal comprises taking the derivative of the conditioned signal.

21. The method of measuring the time-of-flight of a signal as defined in claim 2 wherein identifying a critical point associated with the beginning of the received signal comprises selecting a point having a value less than the maximum value of the discriminated signal.

22. The method of measuring the time-of-flight of a signal as defined in claim 21 wherein selecting a point having a value less than the maximum value of the discriminated signal comprises selecting a point on a positive slope of the discriminated signal.

23. The method of measuring the time-of-flight of a signal as defined in claim 21 wherein selecting a point having a value less than the maximum value of the discriminated signal comprises selecting a point on a negative slope of the discriminated signal.

24. The method of measuring the time-of-flight of a signal as defined in claim 2 wherein identifying a critical point associated with the beginning of the received signal comprises selecting a point having a value equal to the maximum value of the discriminated signal.

25. The method of measuring the time-of-flight of a signal as defined in claim 1 wherein using the critical point for determining the time-of-flight of the signal comprises:
  (a) ascertaining at least one marker point related to an intrinsic characteristic of the received signal and the marker point having a temporal relationship with the critical point, and
  (b) using the marker point for determining the time-of-flight of the signal since commencement.

26. The method of measuring the time-of-flight of a signal as defined in claim 25 wherein ascertaining at least one marker point comprises the steps of:
  (a) identifying a signal attribute which attribute is an intrinsic characteristic of the received signal and has a temporal relationship with the critical point, and
  (b) ascertaining marker points proximate to and bracketing the signal attribute.

27. The method of measuring the time-of-flight of a signal as defined in claim 25 wherein the intrinsic characteristic of the received signal is a positive zero crossing.

28. The method of measuring the time-of-flight of a signal as defined in claim 25 wherein the intrinsic characteristic of the received signal is a negative zero crossing.

29. The method of measuring the time-of-flight of a signal as defined in claim 25 wherein the intrinsic characteristic of the received signal is a peak.

30. The method of measuring the time-of-flight of a signal as defined in claim 25 wherein the intrinsic characteristic of the received signal is a trough.

31. The method of claim 25, wherein said step of ascertaining locates two marker points.

32. The method of measuring the time-of-flight of a signal as defined in claim 1 further comprising:
  (a) identifying at least two marker points,
  (b) interpolating between the marker points for calculating a value of an intrinsic characteristic of the received signal, and
  (c) using the calculated value of the intrinsic characteristic of the received signal for determining the time-of-flight of the signal.

33. The method of claim 1, wherein said estimated beginning of said signal is used to determine said time of flight without establishing associated marker points.

34. A method of measuring the time-of-flight of a signal in an ultrasonic flow meter comprising:
  (a) accepting the signal for generating a received signal,
  (b) identifying a critical point associated with the beginning of the received signal where the critical point is defined as the identified beginning of the received signal,
  (c) ascertaining a marker point related to an intrinsic characteristic of the received signal and having a temporal relationship with the critical point, and
  (d) using the marker point for determining the time-of-flight of the signal since commencement.

35. The method of measuring the time-of-flight of a signal as defined in claim 34 further comprising, prior to identifying a critical point associated with the beginning of the received signal:
  (a) operating on the received signal for generating a pre-conditioned signal,
  (b) operating on the pre-conditioned signal for generating a conditioned signal, and
  (c) operating on the conditioned signal for generating a discriminated signal.

36. The method of measuring the time-of-flight of a signal as defined in claim 35 wherein operating on the received signal comprises squaring the received signal.

37. The method of measuring the time-of-flight of a signal as defined in claim 35 wherein operating on the received signal comprises taking the absolute value of the received signal.

38. The method of measuring the time-of-flight of a signal as defined in claim 35 wherein operating on the received signal comprises a full wave rectification of the received signal.

39. The method of measuring the time-of-flight of a signal as defined in claim 35 wherein operating on the received signal comprises a half wave rectification of the received signal.

40. The method of measuring the time-of-flight of a signal as defined in claim 35 wherein operating on the preconditioned signal for generating a conditioned signal comprises taking a moving average of the pre-conditioned signal.

41. The method of measuring the time-of-flight of a signal as defined in claim 40 wherein taking a moving average of the pre-conditioned signal comprises averaging the pre-conditioned signal by applying a window function.

42. The method of measuring the time-of-flight of a signal as defined in claim 41 wherein taking a moving average of the pre-conditioned signal by applying a window function further comprises selecting the window length to be proportional to the period of the received signal.

43. The method of measuring the time-of-flight of a signal as defined in claim 42 wherein selecting the window length to be proportional to the period of the received signal comprises selecting the window length to be between 0.5 and 5.0 of the period.

44. The method of measuring the time-of-flight of a signal as defined in claim 41 wherein averaging the pre-conditioned signal by applying a window function comprises averaging by applying a rectangular window function.

45. The method of measuring the time-of-flight of a signal as defined in claim 41 wherein averaging the preconditioned signal by applying a window function comprises averaging by applying a cosine window function.

46. The method of measuring the time-of-flight of a signal as defined in claim 41 wherein averaging the preconditioned signal by applying a window function comprises averaging by applying a Hamming window function.

47. The method of measuring the time-of-flight of a signal as defined in claim 41 wherein averaging the preconditioned signal by applying a window function comprises averaging by applying a Hanning window function.

48. The method of measuring the time-of-flight of a signal as defined in claim 41 wherein averaging the preconditioned signal by applying a window function comprises averaging by applying a Kaiser window function.

49. The method of measuring the time-of-flight of a signal as defined in claim 41 wherein averaging the preconditioned signal by applying a window function comprises averaging by applying a Bartlett window function.

50. The method of measuring the time-of-flight of a signal as defined in claim 35 wherein operating on the conditioned signal for generating a discriminated signal comprises evaluating an energy ratio function of the received signal.

51. The method of measuring the time-of-flight of a signal as defined in claim 50 wherein evaluating an energy ratio function of the conditioned signal comprises the step of selecting a time lag proportional to the period of the received signal.

52. The method of measuring the time-of-flight of a signal as defined in claim 51 wherein selecting a time lag proportional to the period of the received signal comprises selecting the time lag to be between 0.1 and 10 of the period.

53. The method of measuring the time-of-flight of a signal as defined in claim 35 wherein operating on the conditioned signal for generating a discriminated signal comprises taking the derivative of the conditioned signal.

54. The method of measuring the time-of-flight of a signal as defined in claim 34 wherein identifying a critical point associated with the beginning of the received signal comprises selecting a point having a value less than the maximum value of a discriminated signal.

55. The method of measuring the time-of-flight of a signal as defined in claim 54 wherein selecting a point having a value less than the maximum value of a discriminated signal comprises selecting a point on a positive slope of the discriminated signal.

56. The method of measuring the time-of-flight of a signal as defined in claim 54 wherein selecting a point having a value less than the maximum value of a discriminated signal comprises selecting a point on a negative slope of the discriminated signal.

57. The method of measuring the time-of-flight of a signal as defined in claim 34 wherein identifying a critical point associated with the beginning of the signal comprises selecting a point having a value equal to the maximum value of a discriminated signal.

58. The method of measuring the time-of-flight of a signal as defined in claim 34 wherein ascertaining a marker point comprises:
  (a) identifying a signal attribute which attribute is an intrinsic characteristic of the received signal and has a temporal relationship with the critical point, and
  (b) ascertaining the marker point proximate to the signal attribute.

59. The method of measuring the time-of-flight of a signal as defined in claim 58 wherein identifying a signal attribute which attribute is an intrinsic characteristic of the received signal comprises the step of identifying a positive zero crossing.

60. The method of measuring the time-of-flight of a signal as defined in claim 58 wherein identifying a signal attribute which attribute is an intrinsic characteristic of the received signal comprises the step of identifying a negative zero crossing.

61. The method of measuring the time-of-flight of a signal as defined in claim 58 wherein identifying a signal attribute which attribute is an intrinsic characteristic of the received signal comprises the step of identifying a peak.

62. The method of measuring the time-of-flight of a signal as defined in claim 58 wherein identifying a signal attribute which attribute is an intrinsic characteristic of the received signal comprises the step of identifying a trough.

63. The method of measuring the time-of-flight of a signal as defined in claim 58 further comprising:
  (a) identifying at least two marker points,
  (b) interpolating between the marker points for calculating a value of the intrinsic characteristic of the received signal, and
  (c) using the calculated value of the intrinsic characteristic of the received signal for determining the time-of-flight of the signal.

64. The method of claim 34, wherein said identified beginning of said signal is used to determine said time of flight without establishing associated marker points.

65. A method of measuring the time-of-flight of a signal in an ultrasonic flow meter comprising:
  (a) transmitting the signal in a flowing fluid with a transducer,
  (b) sensing the signal with a sensor to produce a received signal,
  (c) identifying a critical point where the critical point is defined as the estimated beginning of the received signal by
    (1) evaluating an energy ratio function, and
    (2) setting the critical point at approximately one-fourth of the maximum of the energy ratio function on the positive slope of the energy ratio function,
  (d) ascertaining at least two marker points related to a signal attribute which attribute is an intrinsic characteristic of the received signal and having a temporal relationship with the critical point, comprising
    (1) determining the signal attribute to be a positive zero crossing, and
    (2) identifying a plurality of marker points on the received signal which are proximate to the positive zero crossing,
  (e) interpolating between the marker points to determine a measurement point of the positive zero crossing, and
  (f) using the measurement point for determining the time-of-flight of the signal.

66. A method of measuring the time-of-flight of a signal as defined in claim 65 further comprising digitizing the received signal prior to identifying a critical point.

67. A method of measuring the time-of-flight of a signal as defined in claim 66 further comprising enhancing the digitized signal prior to identifying a critical point.

68. A method of measuring the time-of-flight of a signal as defined in claim 67 wherein enhancing the digitized signal prior to identifying a critical point comprises filtering the digitized signal prior to identifying a critical point.

69. A method of measuring the time-of-flight of a signal as defined in claim 67 wherein enhancing the digitized signal prior to identifying a critical point comprises stacking the digitized signal prior to identifying a critical point.

70. A method of measuring the time-of-flight of a signal in an ultrasonic flow meter comprising:
   (a) transmitting the signal in a fluid with a transducer,
   (b) sensing the signal with a sensor to produce a received signal,
   (c) squaring the received signal after receipt for generating a pre-conditioned signal,
   (d) taking a moving average of the pre-conditioned signal for generating a conditioned signal, wherein the step of taking a moving average further comprises applying a rectangular window function,
   (e) operating on the conditioned signal for generating a discriminated signal by evaluating an energy ratio function of the signal,
   (f) identifying a critical point associated with the beginning of the received signal by selecting a point where the discriminated signal has a value of approximately 25% of the maximum value of the discriminated signal,
   (g) identifying a signal attribute which attribute is an intrinsic characteristic of the received signal and has a temporal relationship with the critical point wherein the signal attribute is a positive zero crossing,
   (h) identifying at least two marker points,
   (i) interpolating between the marker points for calculating a value of the intrinsic characteristic of the received signal, and
   (j) using the calculated value of the intrinsic characteristic of the received signal for determining the time-of-flight of the signal.

71. An apparatus of measuring the time-of-flight of a signal in an ultrasonic flow meter comprising:
   (a) a transmitter for emitting the signal,
   (b) a receiver for receiving the signal from the transmitter and for generating a received signal,
   (c) means for detecting a critical point where the critical point is defined as the estimated beginning of the received signal,
   (d) means for determining a point of measurement within the received signal, and
   (e) means for measuring the elapsed time from transmission of the signal.

72. An ultrasonic flow meter suitable to measure the speed of a flowing fluid, comprising:
   an ultrasonic transmitter capable of emitting an ultrasonic signal;
   an ultrasonic receiver positioned to receive said ultrasonic signal;
   a controller associated with said ultrasonic receiver, said controller capable of receiving a representation of said ultrasonic received signal, wherein said controller is configured to determine a rate of change in energy of said representation for selected temporal locations on said representation.

73. The ultrasonic flow meter of claim 72, wherein said representation is a digital representation.

74. The ultrasonic flow meter of claim 72, wherein said rate of change is determined by processing said representation to generate a pre-conditioned signal, operating on said pre-conditioned signal to generate a conditioned signal, and transforming said conditioned signal to generate a discriminated signal.

75. The ultrasonic flow meter of claim 72, wherein said determination of said energy rate of change comprises taking an energy ratio function based upon a moving average.

76. The ultrasonic flow meter of claim 72, wherein said rate of change is determined by computing a mathematical derivative.

77. The ultrasonic flow meter of claim 72, wherein said rate of change has a maximum, and said controller determines a fraction of said maximum, wherein a temporal location on said received ultrasonic signal corresponds to said fraction, and said temporal location estimates the beginning of said received signal.

78. The ultrasonic flow meter of claim 77, wherein said fraction is about 25 percent.

79. A method of determining a time of arrival of an ultrasonic signal, comprising:
   (a) transmitting an ultrasonic signal by a first transducer;
   (b) receiving said ultrasonic signal by a second transducer;
   (c) converting said received ultrasonic signal by a controller to yield an indication of a rate of change in energy in said ultrasonic signal as a function of time;
   (d) determining a point of maximum energy rate of change based on said converting; and
   (e) establishing a time of arrival for said received ultrasonic signal based upon said point of maximum energy rate of change.

80. The method of claim 79, wherein said controller is a micro-processor.

81. The method of claim 79, wherein said conversion of said received ultrasonic signal to yield an indication of said rate of change in energy includes squaring said received ultrasonic signal.

82. The method of claim 79, wherein said conversion of said received ultrasonic signal to yield an indication of said rate of change in energy includes taking the absolute value of the received ultrasonic signal.

83. The method of claim 79, wherein said conversion of said received ultrasonic signal to yield an indication of said rate of change in energy includes computing a moving average.

84. The method of claim 79, wherein said conversion of said received ultrasonic signal to yield an indication of said rate of change in energy includes evaluating a plurality of energy ratios.

85. The method of claim 84, wherein said evaluation of a plurality of energy ratios includes selecting a time delay proportional to the period of the received signal.

86. An apparatus that measures the time of arrival of an ultrasonic signal in an ultrasonic flow meter, comprising:
   an ultrasonic transmitter that emits an ultrasonic signal into the flow meter;
   an ultrasonic detector that receives the transmitted ultrasonic signal and in response generates an electrical signal;
   a controller that receives the electrical signal and defines the estimated time when the ultrasonic signal is received by said ultrasonic detector by processing said electrical signal to yield rates of change in energy of said electrical signal.

87. The apparatus of claim 86, wherein said rates of change are established by an energy ratio curve, said energy ratio being based on a moving window.

* * * * *